(12) United States Patent
Hasan et al.

(10) Patent No.: US 7,646,832 B2
(45) Date of Patent: Jan. 12, 2010

(54) SIGNAL RECEIVER

(75) Inventors: Khairul Hasan, Surry (GB); Sathiaseelan Sundaralingam, Camberley (GB); Eric Jones, Cowplain (GB); Michael S. Mouna-Kingue, Worcester Park (GB); Rade Luburic, Farnborough (GB); Santosh Nath, West Benegal (IN)

(73) Assignee: Nokia Corporation, Espoo (FI)

( * ) Notice: Subject to any disclaimer, the term of this patent is extended or adjusted under 35 U.S.C. 154(b) by 629 days.

(21) Appl. No.: 11/239,280

(22) Filed: Sep. 30, 2005

(65) Prior Publication Data

US 2006/0093073 A1    May 4, 2006

(30) Foreign Application Priority Data

Oct. 1, 2004    (GB) .................................. 0421930.9

(51) Int. Cl.
 H03D 1/04 (2006.01)
 H03D 1/06 (2006.01)
 H03K 6/04 (2006.01)
 H03K 5/01 (2006.01)
 H04B 1/10 (2006.01)
 H04L 1/00 (2006.01)
 H04L 25/08 (2006.01)

(52) U.S. Cl. ...................... 375/346; 375/316; 375/340; 375/343; 327/310; 327/384; 327/551; 455/296; 370/320; 370/335; 370/342; 370/441; 370/479

(58) Field of Classification Search ................. 375/336, 375/316, 340, 343, 274, 305; 329/300
 See application file for complete search history.

(56) References Cited

U.S. PATENT DOCUMENTS

| | | | | |
|---|---|---|---|---|
| 5,142,553 A | * | 8/1992 | Rosenkranz | 375/316 |
| 6,055,284 A | * | 4/2000 | Kweon | 375/355 |
| 6,289,041 B1 | * | 9/2001 | Krasner | 375/152 |
| 6,681,204 B2 | * | 1/2004 | Matsumoto et al. | 704/230 |
| 6,944,434 B2 | * | 9/2005 | Mattellini et al. | 455/296 |
| 7,139,338 B2 | * | 11/2006 | Wilson et al. | 375/343 |
| 7,292,650 B2 | * | 11/2007 | Lee et al. | 375/316 |
| 7,561,860 B2 | * | 7/2009 | Matsumoto | 455/189.1 |
| 2003/0063596 A1 | * | 4/2003 | Arslan et al. | 370/347 |
| 2003/0142734 A1 | * | 7/2003 | Black et al. | 375/149 |
| 2004/0022335 A1 | * | 2/2004 | Arslan et al. | 375/346 |
| 2004/0120300 A1 | * | 6/2004 | Saquib | 370/342 |
| 2005/0220229 A1 | * | 10/2005 | Goto | 375/343 |
| 2006/0132955 A1 | * | 6/2006 | Annampedu et al. | 360/49 |
| 2006/0239655 A1 | * | 10/2006 | Ogura et al. | 386/111 |
| 2008/0181342 A1 | * | 7/2008 | Cho et al. | 375/347 |

* cited by examiner

*Primary Examiner*—Shuwang Liu
*Assistant Examiner*—Gina McKie
(74) *Attorney, Agent, or Firm*—Squire, Sanders & Dempsey, L.L.P.

(57) ABSTRACT

A signal receiver includes a sampling device for sampling a received signal carrying a stream of symbols to form a first set of actual samples. The signal receiver also includes interpolation means for interpolating between the samples of the first set to form a second set of interpolated samples. The signal receiver also includes symbol recovery means configured to process the first and second sets of samples so as to form an estimate of the symbols of the signal. The processing includes performing a temporal whitening step on signals derived from first and second sets of samples. The signal receiver also includes signal combining means using a matched filter and averaging technique.

33 Claims, 3 Drawing Sheets

Improved symbol-spaced GMSK receiver structure

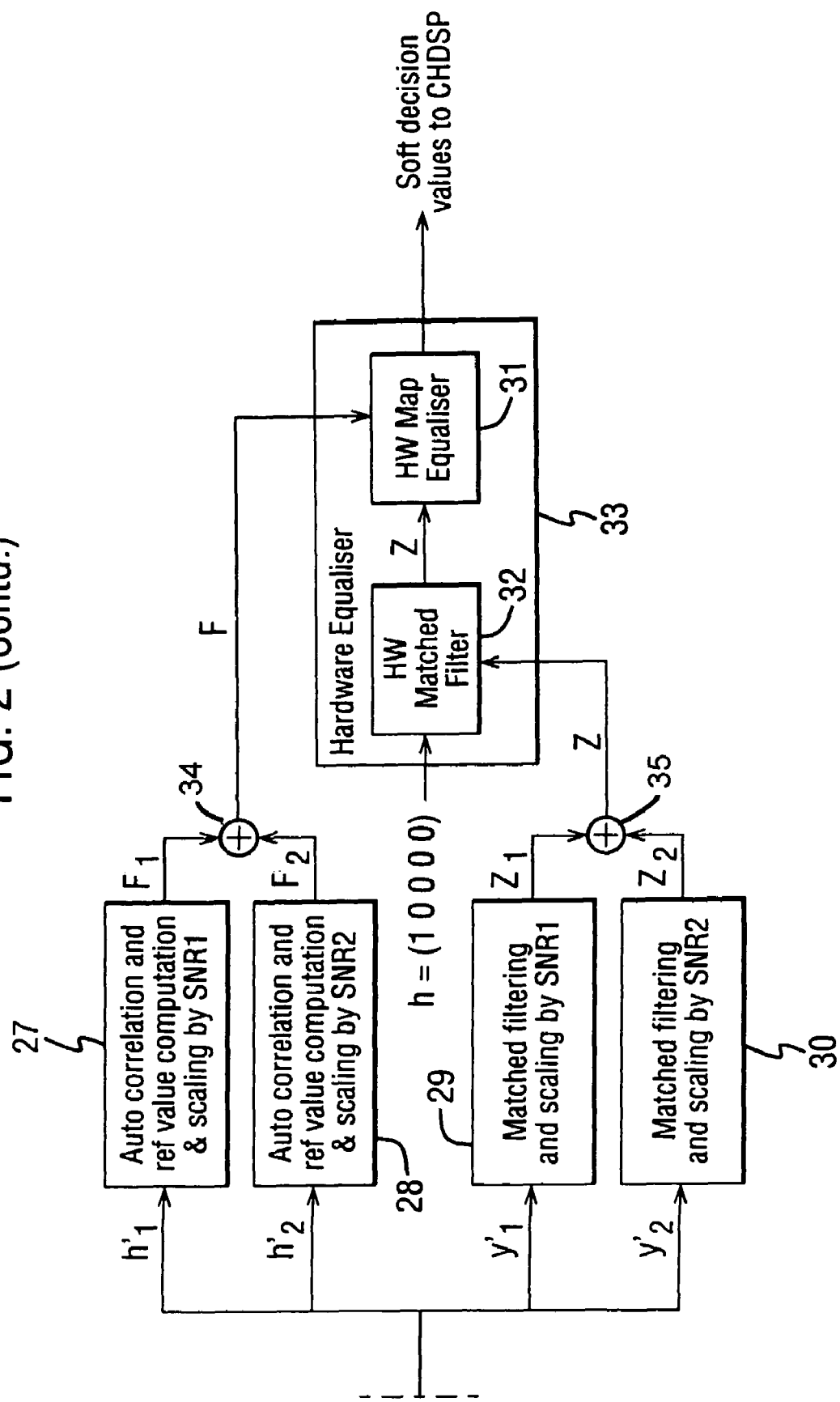
FIG. 2 (Contd.)

SIGNAL RECEIVER

BACKGROUND OF THE INVENTION

1. Field of the Invention

This invention relates to signal receivers, especially receivers for radio signals as are used in base transceiver stations (BTSs) and mobile phones or mobile communication systems.

FIG. 1 shows the architecture of a receiver suitable for receiving GMSK (Gaussian minimum shift-keyed) modulated signals. Such signals generally comprise a train of symbols equally spaced in time. Before the modulation each symbol takes one of two values, conventionally denoted +1 and −1. After GMSK modulation the signals comprise of complex valued samples each having a I (in-phase) and a Q (quadrature-phase) component. These signals are received at an antenna 1 and pre-processed by a front-end section shown schematically at 2. The pre-processing involves amplification and basic filtering. The signal is then sampled at the symbol frequency by a sampling unit 3 to form a train of complex samples denoted r. The samples are then demodulated by a demodulation unit 4 to form a train of symbol estimates y. The symbol estimates are passed to an equaliser 5, which forms an estimate of the received symbols and outputs them at 6 for further processing to decode the information represented by them. The sampling unit in this receiver provides only one sample per symbol. Further processing of the signal happens by considering one sample per symbol. Therefore, it may be called a "symbol-spaced" receiver.

2. Description of the Related Art

During their passage from the transmitter to the receiver the symbols will have been subject to interference. The interference may include:

Interference from other signals on the channel. That may be spectrally neutral ("white") interference; or interference that is spectrally biased ("coloured" interference). Coloured interference often results from interference from other signals of the same communication system.

Interference arising from the propagation of the signal in question itself. This includes inter-symbol interference: interference between nearby symbols in that signal due to their having travelled from the transmitter to the receiver on multiple paths of different lengths.

In order to allow the signal to be recovered reliably at the receiver, the effects of interference must be taken into account. To achieve this the symbol estimates y are passed to a channel estimator 7 which forms an estimate of the effects of the channel by analysing the form of a known training sequence of symbols as received. The channel estimator forms an estimate h of the signal prior to distortion by the channel. h and y are passed to an SNR estimator 8 which estimates the signal-to-noise ratio (SNR) of the received signal. h is also passed to an auto-correlation computation unit 9 which generates a reference signal F. F and the SNR estimate are passed to a GMSK scaling unit 10 which scales h and F by the SNR estimate and produces corresponding h' and F'. h' represents a set of filter taps gauged to represent the characteristics of the channel. Those are applied to a matched filter unit 11 of the equaliser 5 which filters the samples y in accordance with the taps h' to form Z. Z and F' are passed to an equaliser 12 which estimates the symbols that made up the received signal. One way in which that may be done is by computing based on the channel estimate h' the likely effect of the channel on all possible sets of received symbols, and comparing those sets with the actual received signal to determine the best fit. The symbols in the best-fitting set are adopted as the estimate that is output at 6 for further processing.

One approach that has been taken to improve the accuracy of decoding is to oversample the received signal. By taking samples of the received signal at a higher frequency than the symbol rate more data on the received signal is obtained, which can be used to improve the decoding process. Since the additional samples have been generated from actual sampling of the received signal they include additional data over that contained in a set of samples taken at the symbol rate, which can be used (e.g. by means of a temporal whitening technique) to help eliminate co-channel and adjacent-channel interference. This type of receiver may be called a "fractionally-spaced" receiver. However, in some situations the receiver may not have the capability of performing oversampling, and so this route is not available.

One example of this situation is where a radio-frequency module (RFM) of receiver has been designed in such a way that it provides only one sample per symbol to the base-band module where the rest of the signal processing takes place. Radio-frequency module is the receiver front-end component that performs amplification, front-end filtering and sampling. Usually this component comes as a hardware solution. The base-band module is where digital signal processing takes place. Usually this part is implemented partly through software and partly through hardware.

In recent days the radio-frequency module of a receiver has been designed to provide more than one sample per symbol to the base-band unit. At the same time, the digital signal processing functions in the base-band unit of receiver make use of this extra group of samples to enhance the performance of receiver. But such RFMs introduce additional cost to the overall receiver.

There are customers who do not wish to replace their old radio-frequency modules, but want to change their base-band units. They may not want the best but at least improved performance from their receiver by replacing only the base-band modules. Therefore, it is desired to enhance the old symbol-spaced GMSK receiver and integrate it into the new base-band unit so that it can cope with one sample per symbol, yet with better performance.

As mentioned above, in a typical receiver the signal processing in the base-band unit is split between software and dedicated hardware elements. The software is typically executed by a DSP (digital signal processor) which can only carry out a limited number of operations in the time available between successive symbols. Therefore, it is essential to streamline the software so that it can be carried out by suitable DSPs. The hardware may be pre-existing, or may be shared between different platforms, so it is desirable if the receiver design can take advantage of standard hardware.

SUMMARY OF THE INVENTION

According to one aspect of the present invention there is provided a signal receiver comprising: a sampling device for sampling a received signal carrying a stream of symbols to form a first set of actual samples; interpolation means for interpolating between the samples of the first set to form a second set of interpolated samples; symbol recovery means arranged to process the first and second sets of samples so as to form an estimate of the symbols of the signal, the processing including performing a temporal whitening step on signals derived from the first and second sets of samples.

According to a second aspect of the present invention there is provided a method for processing a received signal, the method comprising: sampling a received signal carrying a stream of symbols to form a first set of actual samples; interpolating between the samples of the first set to form a second set of interpolated samples; processing the first and second sets of samples so as to form an estimate of the symbols of the signal, the processing including performing a temporal whitening step on signals derived from the first and second sets of samples.

Preferably the symbol recovery means comprises: a demodulation unit for demodulating the first and second sets of samples to produce first and second demodulated data sets respectively. Preferably the symbol recovery means comprises: a channel estimation unit for performing channel estimation on the first and second demodulated data sets to form first and second channel estimation data sets respectively, the first and second channel estimation data sets being the said signals derived from each of the first and second sets of samples.

Preferably the temporal whitening step comprises: for each successive pair of data $y_1$, $y_2$ from the first channel estimation data set and each successive pair of data $h_1$, $h_2$ from the first channel estimation data set, forming first partially whitened signals $y''_1$ and $y''_2$ and second partially whitened signals $h''_1$ and $h''_2$ respectively in accordance with equations 16 to 19 herein; and forming the said signals derived from the first and second sets of samples by scaling the first and second partially whitened signals in accordance with an estimate of received noise.

Preferably the first whitened signals are formed by dividing the first channel estimation data by $\sigma_1^2$ and the second whitened signals are formed by dividing the second channel estimation data by $\tilde{\sigma}^2$, where $\sigma_1^2$ and $\tilde{\sigma}^2$ are determined in accordance with equations 2 and 8 herein.

Preferably the symbol recovery means comprises a digital signal processor.

Preferably the temporal whitening is performed by executing a series of instructions by means of the digital signal processor.

Preferably the symbols are carried in the received signal by GMSK modulation.

Preferably the signal receiver is a signal receiver of a base transceiver station of a mobile communications network.

Preferably the received signal is a radio signal.

According to a third aspect of the present invention there is provided a signal receiver comprising: a sampling device for sampling a received signal carrying a stream of symbols to form a first set of actual samples; interpolation means for interpolating between the samples of the first set to form a second set of interpolated samples; symbol recovery means arranged to process the first and second sets of samples so as to form an estimate of the symbols of the signal, the processing including performing a matched filtering operation by means of performing individual matched filter operations on signals derived from each of the first and second sets of samples and subsequently averaging the outputs of the individual matched filter operations to form a matched filter output.

According to a fourth aspect of the present invention there is provided a method for processing a received signal, comprising: sampling a received signal carrying a stream of symbols to form a first set of actual samples; interpolating between the samples of the first set to form a second set of interpolated samples; processing the first and second sets of samples so as to form an estimate of the symbols of the signal, the processing including performing a matched filtering operation by means of performing individual matched filter operations on signals derived from each of the first and second sets of samples and subsequently averaging the outputs of the individual matched filter operations to form a matched filter output.

Preferably the symbol recovery means comprises: a demodulation unit for demodulating the first and second sets of samples to produce first and second demodulated data sets respectively; a channel estimation unit for performing channel estimation on the first and second demodulated data sets to form first and second channel estimation data sets respectively; and a temporal whitening unit for performing temporal whitening on the first and second channel estimation data sets to form data for input to the matched filter operations as the said signals derived from each of the first and second sets of samples.

Preferably the individual matched filter operations are performed in accordance with equations 20 and 21 herein.

Preferably the symbol recovery means comprises a digital signal processor.

Preferably the matched filter operations are performed by executing a series of instructions by means of the digital signal processor.

Preferably the symbols are carried in the received signal by GMSK modulation.

Preferably the signal receiver is a signal receiver of a base transceiver station of a mobile communications network.

Preferably the received signal is a radio signal.

According to a fifth aspect of the present invention there is provided a signal receiver comprising: a sampling device for sampling a received signal carrying a stream of symbols to form a first set of actual samples; symbol recovery means arranged to process the first and second sets of samples so as to form an estimate of the symbols of the signal, the processing including performing a matched filtering operation, wherein the matched filtering operation is performed by processing software, the output of which is passed for subsequent processing via a hardware matched filter having a plurality of filter taps, all but one of which are set to zero.

According to a sixth aspect of the present invention there is provided a method for processing a received signal, comprising: sampling a received signal carrying a stream of symbols to form a first set of actual samples; processing the first and second sets of samples so as to form an estimate of the symbols of the signal, the processing including the step of performing a matched filtering operation by processing software; and processing the output of the processing software by means of a hardware matched filter having a plurality of filter taps, all but one of which are set to zero.

Preferably the matched filtering operation is performed using a plurality of taps and the symbol recovery means comprises averaging means arranged to receive and average the output of the processing software over the plurality of taps and thereby provide the input to the hardware matched filter.

Preferably the receiver comprises a plurality of components defining a signal path from a radio frequency signal input to a baseband signal output, and the receiver comprises a signal processor located on the signal path for executing the said processing software, and reconfigurable non-volatile memory for storing the processing software for execution by the signal processor, the receiver being configured such that irrespective of the configuration of the memory the hardware matched filter is located on the signal path between the signal processor and the output.

Preferably the matched filter has a primary tap and the said one tap is the primary tap of the matched filter.

Preferably the subsequent processing includes equalization.

Preferably the symbols are carried in the received signal by GMSK modulation.

Preferably the signal receiver is a signal receiver of a base transceiver station of a mobile communications network.

Preferably the received signal is a radio signal.

The present invention also provides a communication terminal comprising a signal receiver having features as set out herein.

The present invention also provides a network element such as a BTS for a telecommunications network comprising a signal receiver having features as set out herein.

The present invention also provides a telecommunications system comprising: a network having at least one network element; and a communication terminal capable of wireless communication with the network element; at least one of the network element and the communication terminal comprising a signal receiver having features as set out herein.

BRIEF DESCRIPTION OF THE DRAWINGS

The present invention will now be described by way of example.

DETAILED DESCRIPTION OF THE PREFERRED EMBODIMENTS

Figure 1:
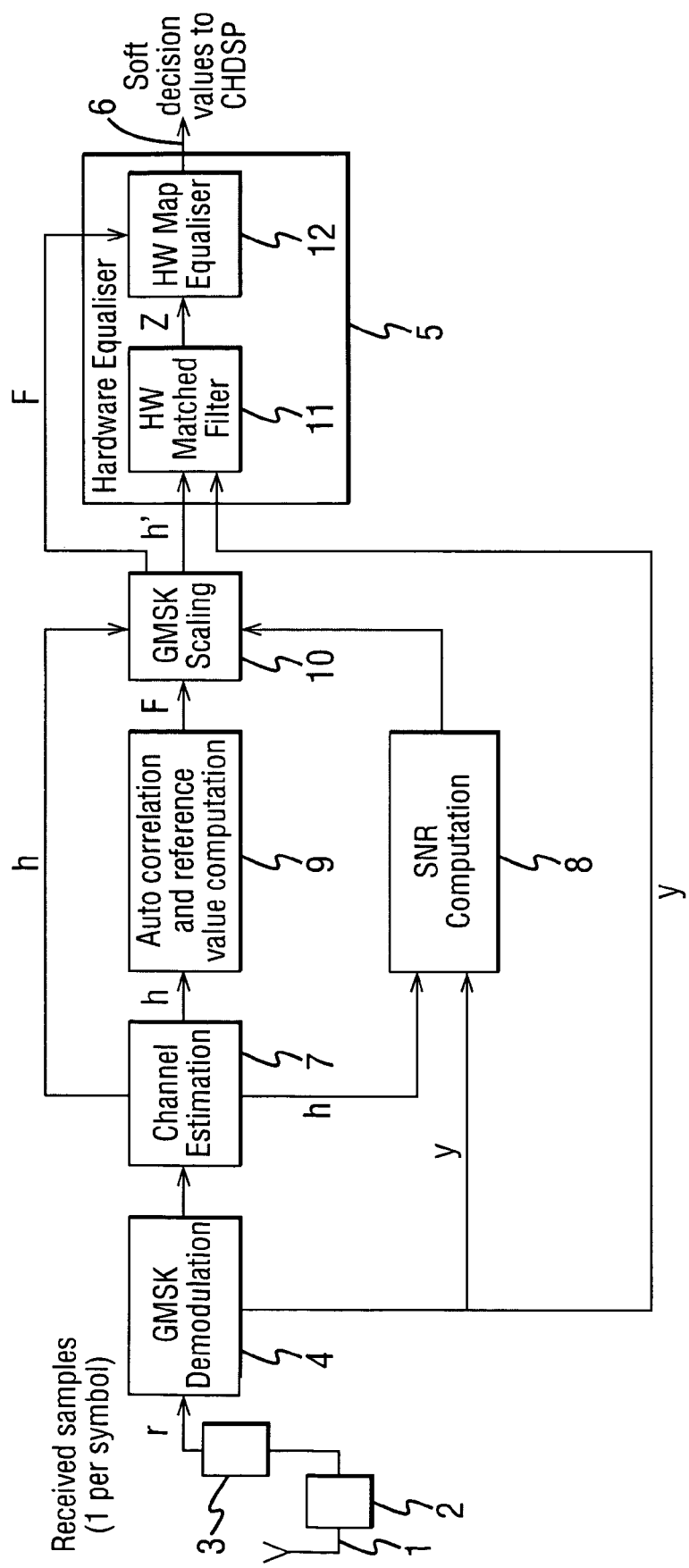
FIG. 1 shows the architecture of a symbol-spaced receiver suitable for receiving GMSK signals.
Figure 2:
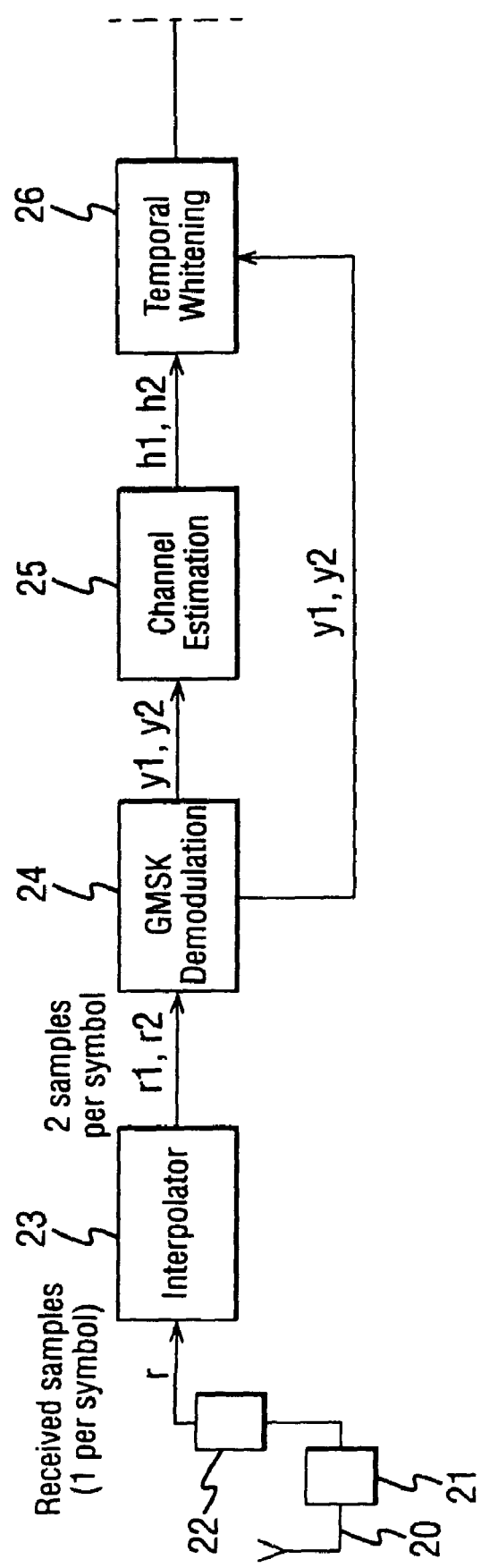
FIG. 2 shows the architecture of an improved symbol-spaced receiver suitable for receiving GMSK signals.

The receiver shown in FIG. 2 is capable of operating with greater accuracy than that of FIG. 1. The receiver of FIG. 2 samples the signal at the symbol frequency. Then an additional set of samples is generated by interpolating between the sampled symbols. The original and additional samples are subjected to temporal whitening process in order to reduce the apparent correlation between them. The correlation arises due to the signal being corrupted by the interference coming from other signals of similar frequency band. Removing the correlation between the two group of received samples, in other way, means the removal of interference or coloured noise from them. Then the signals are subjected to matched filtering and decimation, before being passed to an equaliser which decides on the symbols that are to be generated as output.

1. Receiver Front-End (Radio Frequency Module)

The radio signal is received from the radio channel by an antenna 20. The signal is then passed to the radio-frequency module 21 for pre-processing. The pre-processing involves amplification and basic filtering. It is normally viewed as being desirable to filter the received signal relatively narrowly (e.g. normalised bandwidth of 0.7), so as to cut out adjacent channel interference. In contrast, it has been found that a wider bandpass (e.g. normalised bandwidth of 1.0) front end provides better accuracy of symbol recovery in the architecture of FIG. 2.

The signal is then sampled at the symbol frequency by a sampling unit 22 to form a train of original complex samples r. Assuming the signals represents a burst of length N symbols then the original samples will be represented as r(n) for $0 \leq n \leq N-1$.

2. Interpolation:

The samples r are passed to an interpolation unit 23, which interpolates them to form a set of additional samples. Numerous interpolation methods could be used. It has been found that a simple linear interpolation process is effective. In this process the second set of samples $r_2(n)$ is formed according to:

$$r_1(n) = r(n), \text{ for } 0 < n < N-1 \quad (1)$$

$$r_2(n) = \frac{r(n) + r(n+1)}{2} \text{ for } 0 < n < N-1$$

The set of original samples $r_1(n)$ is denoted the even set and the set of interpolated samples $r_2(n)$ is denoted the odd set.

It should be noted that more than one additional sample could be formed between each pair of original samples.

The even and odd samples are demodulated by a demodulation unit 24 to form sample sets $y_1(n)$ and $y_2(n)$ respectively.

3. Channel Estimation and Whitening:

The signals $y_1(n)$ and $y_2(n)$ are passed to a channel estimation unit 25 which forms corresponding outputs $h_1(n)$ and $h_2(n)$. Those together with the signals $y_1(n)$ and $y_2(n)$ are passed to a temporal whitening unit 26. The whitening mechanism involves generation of noise co-variance matrix, generation of a transform matrix from the noise co-variance matrix and applying the transform matrix onto the two groups of samples and taps separately.

The noise co-variance matrix for the demodulated signal is defined as, $$A = \begin{bmatrix} \text{var}(e_1) & cov(e_1, e_2) \\ cov(e_2, e_1) & \text{var}(e_2) \end{bmatrix} = \begin{bmatrix} \sigma_1^2 & c \\ c^* & \sigma_2^2 \end{bmatrix} \text{where,} \quad (2)$$

$$\begin{bmatrix} e_1 \\ e_2 \end{bmatrix} = \begin{bmatrix} y_1 \\ y_2 \end{bmatrix} - \begin{bmatrix} h_1 \\ h_2 \end{bmatrix} x \quad (3)$$

and where, x is the transmitted signal vector, $y_1$ and $y_2$ are the even and odd samples of the received signals, $h_1$ and $h_2$ are the corresponding channel impulse response vectors and $e_1$ and $e_2$ are the noise signals. It should be noted here that in the above equation we need only the training sequence portion of the vectors x, $y_1$ and $y_2$. Therefore, the difference between the received training sequence and the transmitted known training sequence, conditioned by the channel taps, gives as the error or noise signals.

The actual noise de-correlation or whitening process involves operating on signal and channel taps by a transform matrix T which can be obtained from the noise co-variance matrix A. The derivation of T from A is considered below.

According to the maximum likelihood (ML) criterion the receiver needs to find x that minimizes the overall cost function below, $$-J = e^H A^{-1} e \quad (4)$$

Where:

$$e = \begin{bmatrix} e_1 \\ e_2 \end{bmatrix} \text{ and } A = E(ee^H) \quad (5)$$

However, before minimising the cost function the goal is to mathematically eliminate correlation between even and odd samples. That can be done if the off-diagonal elements of matrix A can be made zero; in other words we have to make A a diagonal matrix. This involves factorisation of matrix $A^{-1}$ and can be done by Cholesky decomposition of A. Assume that $A^{-1}$ can be defined so that $$A^{-1} = TD^{-1}T^H \quad (6)$$

where, $$D^{-1} = \begin{bmatrix} 1 & 0 \\ 0 & 1 \end{bmatrix}$$

and the T matrix represents the Cholesky factors of $A^{-1}$. From the equations above T can be derived as:

$$T = \begin{bmatrix} \frac{1}{\sigma_1} & 0 \\ -\frac{c}{\sigma_1^2 \tilde{\sigma}} & \frac{1}{\tilde{\sigma}} \end{bmatrix} \text{ where} \quad (7)$$

$$\tilde{\sigma}^2 = \sigma_2^2 - \frac{|c|^2}{\sigma_1^2} \quad (8)$$

Now, transforming of the signal y by T yields, $$\begin{bmatrix} y'_1 \\ y'_2 \end{bmatrix} = T \begin{bmatrix} y_1 \\ y_2 \end{bmatrix} = \begin{bmatrix} \frac{1}{\sigma_1} y_1 \\ -\frac{c}{\sigma_1^2 \tilde{\sigma}} y_1 + \frac{1}{\tilde{\sigma}} y_2 \end{bmatrix} \quad (9)$$

And transforming the channel impulse response taps by T yields, $$\begin{bmatrix} h'_1 \\ h'_2 \end{bmatrix} = T \begin{bmatrix} h_1 \\ h_2 \end{bmatrix} = \begin{bmatrix} \frac{1}{\sigma_1} h_1 \\ -\frac{c}{\sigma_1^2 \tilde{\sigma}} h_1 + \frac{1}{\tilde{\sigma}} h_2 \end{bmatrix} \quad (10)$$

Therefore, a new noise vector can be computed according to:

$$\begin{bmatrix} e'_1 \\ e'_2 \end{bmatrix} = \begin{bmatrix} y'_1 \\ y'_2 \end{bmatrix} - \begin{bmatrix} h'_1 \\ h'_2 \end{bmatrix} x \quad (11)$$

Using this vector if we create a noise covariance matrix $D = E(e'e'^H)$, then it can be verified that the matrix is diagonal, which means there is no co-relation between even and odd group of samples after the whitening is done.

When the received samples $y_1$ and $y_2$ and channel taps $h_1$ and $h_2$ are whitened, the computation involved are given in equation (9) and (10) can be re-written as:

$$y'_1 = \frac{1}{\sigma_1} y_1 \quad (12)$$

$$y'_1 = \frac{c}{\sigma_1^2 \tilde{\sigma}} y_1 + \frac{1}{\tilde{\sigma}} y_2 \quad (13)$$

-continued $$h'_1 = \frac{1}{\sigma_1} h_1 \quad (14)$$

$$h'_2 = -\frac{c}{\sigma_1^2 \tilde{\sigma}} h_1 + \frac{1}{\tilde{\sigma}} h_2 \quad (15)$$

Where $y_1$, $y_2$ are unwhitened samples, $h_1$, $h_2$ are un-whitened channel taps, $y'_1$, $y'_2$ are whitened samples and $h'_1$, $h'_2$ are whitened taps. $\sigma_1$, $\tilde{\sigma}$ and c are defined in equations (2) and (8).

Equations (12) and (13) suggest that there will be significant amount of computation in the multiplication process when the length of samples sequence, $y_1$ and $y_2$ is large. In the case of GSM signals the length is 156. It has been identified that computation can be reduced by doing a partial whitening process which is explained below. Then during the matched filter operation the channel taps are modified in such a way that the resultant matched filter output is same as that coming from fully whitened samples and taps.

Assume $$t = \frac{c}{\sigma_1^2},$$

so t is to be calculated and then partial whitening to be applied as in equation (16)-(19)

$$y''_1 = y_1 \quad (16)$$

$$y''_2 = ty_1 + y_2 \quad (17)$$

$$h''_1 = h_1 \quad (18)$$

$$h''_2 = th_1 + h_2 \quad (19)$$

Now the matched filter operation is done in the following way.

$$Z_1(n) = \sum_{j=0}^{4} \text{Re}\left\{ y''_1(n+j) \frac{h''_1(j)^*}{\sigma_1^2} \right\}, 0 < n < L-1 \quad (20)$$

$$Z_2(n) = \sum_{j=0}^{4} \text{Re}\left\{ y''_2(n+j) \frac{h''_2(j)^*}{\tilde{\sigma}^2} \right\}, 0 < n < L-1 \quad (21)$$

The following derivation is to show that equation (20) and (21) represent an actual matched filtering process where fully-whitened samples and taps are used From equation (12), (14), (16), (18) and (20), $$Z_1(n) = \sum_{j=0}^{4} \text{Re}\left\{ \frac{y_1(n+j)}{\sigma_1} \frac{h_1(j)^*}{\sigma_1} \right\}, 0 < n < L-1 \quad (22)$$

$$= \sum_{j=0}^{4} \text{Re}\{ y'_1(n+j) h'_1(j)^* \}, 0 < n < L-1$$

And from equation (13), (15), (17), (19) and (21)

$$Z_2(n) = \sum_{j=0}^{4} \text{Re}\left\{\frac{ty_1(n+j) + y_2(n+j)}{\tilde{\sigma}} \frac{\{th_1(j) + h_2(j)\}^*}{\tilde{\sigma}}\right\}, \quad (23)$$
$$0 < n < L-1$$

$$= \sum_{j=0}^{4} \text{Re}\left[\left\{-\frac{cy_1(n+j)}{\sigma_1^2 \tilde{\sigma}} + \frac{y_2(n+j)}{\tilde{\sigma}}\right\}\left\{-\frac{ch_1(j)}{\sigma_1^2 \tilde{\sigma}} + \frac{h_2(j)}{\tilde{\sigma}}\right\}^*\right],$$
$$0 < n < L-1$$

$$= \sum_{j=0}^{4} \text{Re}\{y_2'(n+j)h_2'(j)^*\}, 0 < n < L-1$$

From equation (22) and (23) it can be seen that the use of samples and taps that are partially whitened yields the same result as though the matched filtering is done using fully whitened samples and taps.

In summary the preferred, simplified whitening and matched filter operation involves:

1. Computation of $\sigma_1^2$, c, $\tilde{\sigma}^2$ and t

2. Partially whitening of samples and taps using equation (16)-(19)

3. Division of the two groups of partially whitened taps (not the samples) by $\sigma_1^2$ and $\tilde{\sigma}^2$ respectively 4. Matched filter operation on partially whitened samples and the scaled taps.

It should also be noted that from the noise variance matrix it is simpler to compute variances $\sigma_1^2$ and $\tilde{\sigma}^2$ than to compute standard deviations $\sigma_1$, $\tilde{\sigma}$. A direct or full whitening process based on equation (12)-(15) requires finding square root of variances to compute the standard deviations. The square root operation is computationally very complex for a fixed point digital signal processor, as is often used in signal receivers, whereas if the preferred whitening process is used then this square root operation is not required.

4. Decimation and Signal Combining:

In a typical fractionally spaced receiver, signals with two samples per symbol are decimated and combined during the pre-filter operation. But the pre-filter approach requires intensive computational complexity due to matrix inversion during pre-filter taps designing. In the receiver described herein, an approach that requires less complexity yet performs efficiently is introduced. First the individual matched filter outputs and GMSK reference values are computed, and then they are averaged to get combined matched filter output and combined GMSK reference values.

The whitened taps are used by auto-correlation units 27, 28 for computing reference values $F_1$ and $F_2$ for even and odd group of channel impulse taps respectively. At first the auto-correlation or ambiguity function, $C_1(i)$, $C_2(i)$ are calculated, which are later convolved with possible hard-decision inter-symbol interference symbol sequences as below.

$$C_1(i) = \sum_{j=0}^{4-i} \text{Re}\{h_1'(i+j)h_1'(j)^*\}, \quad (24)$$
$$(1 \leq i \leq 4)$$
$$C_2(i) = \sum_{j=0}^{4-i} \text{Re}\{h_2'(i+j)h_2'(j)^*\},$$

-continued $$F_1(x_{k-1}, \ldots, x_{k-4}) = \sum_{i=1}^{4} x_{k-i}C_1(i) \quad (25)$$

$$F_2(x_{k-1}, \ldots, x_{k-4}) = \sum_{i=1}^{4} x_{k-i}C_2(i)$$

where, $x_k \in (-1,+1)$ and number of channel taps is 5. Similarly the matched filter output for each group of samples can be computed in blocks 29, 30 using the equations (20) and (21).

Once $F_1$, $F_2$, $Z_1$, and $Z_2$ have been calculated they must be scaled by the noise variance of corresponding group of whitened samples. Then they can be averaged 34 and 35 to compute combined F and Z:

$$F = \frac{F_1 + F_2}{2}, \quad (26)$$
$$Z = \frac{Z_1 + Z_2}{2}$$

5. Equalisation:

Since the matched filter computation can be done inside a DSP (digital signal processor), the same process need not be done in hardware. If the approach described above is to be applied as an upgrade to a pre-existing receiver this may not be straightforward, since the matched filter 32 may be part of the hardware equaliser unit 33 and may not be capable of being be bypassed, so the same matched filter operation would be repeated. However, even in this situation the present approach can be implemented by setting the channel taps of the matched filter so that the primary tap is 1 and the other taps are 0, in order that the filter simply passes Z through unaltered. In the example illustrated in FIG. 2 the filter has 5 taps and. The computed matched filter values Z and the channel taps as (1, 0, 0, 0, 0) are passed to it so that the same matched filter values will be presented at the output of HW matched filter. Since the MAP equaliser 31 itself needs only F and Z and it does not need channel taps, this technique allows the desired output to be obtained without any modification in a hardware equaliser (if present).

Tables 1 below shows the gain that can be achieved by using the receiver of FIG. 2 compared to a prior receivers of the type shown in FIG. 1 in a range of propagation environments. The data in the table is derived from simulations that are carried out using fixed-point models using proper interface scaling.

TABLE 1

Performance gains in dB of improved receiver against prior receiver

| Type of GSM logical channels | Receiver Sensitivity performance Gain (dB) | Co-channel interference performance gain (dB) | Adjacent-channel interference performance gain (dB) |
|---|---|---|---|
| TCHFS | 0.6 | 1.8 | 2.1 |
| GPRS-PDTCH/CS1 | 0.4 | 1.8 | 2.2 |
| GPRS-PDTCH/CS2 | 0.6 | 1.9 | 2.5 |
| GPRS-PDTCH/CS3 | 1.0 | 2.3 | 2.6 |
| GPRS-PDTCH/CS4 | 2.0 | 4.0 | 2.8 |

The incoming symbols could be oversampled and those samples could then be interpolated to form additional samples that are then processed as described above.

The software steps described above could be performed on one or more suitable processors or alternatively by dedicated hardware instead. The hardware steps described above could be performed by software running on one or more suitable processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus, comprising:
   a sampler configured to sample a received signal carrying a stream of symbols to form samples being a first set of actual samples;
   an interpolator configured to interpolate between the samples of the first set of actual samples to form a second set of interpolated samples; and
   a symbol recovery unit configured to process the first set of actual samples and the second set of interpolated samples to form an estimate of the stream of symbols of the received signal by performing temporal whitening on signals derived from the first set of actual samples and the second set of interpolated samples:
   wherein the symbol recovery unit comprises
   a demodulator configured to demodulate the first set of actual samples and the second set of interpolated samples to produce first and second demodulated data sets, respectively, and
   a channel estimator configured to perform a channel estimation on the first and second demodulated data sets to form first and second channel estimation data sets, respectively, the first and second channel estimation data sets being the signals derived from the first set of actual samples and the second set of interpolated samples.

2. The apparatus as claimed in claim 1, wherein, for each successive pair of data $y_1$, $y_2$ from the first channel estimation data set and each successive pair of data $h_1$, $h_2$ from the first channel estimation data set, the symbol recovery unit is configured to perform the temporal whitening by forming first partially whitened signals $y''_1$ and $y''_2$ and second partially whitened signals $h''_1$ and $h''_2$, respectively, in accordance with equations $y''_1 = y_1$ $y''_2 = ty_1 + y_2$ $h''_1 = h_1$ $h''_2 = th_1 + h_2$; and forming the signals derived from the first set of actual samples and the second set of interpolated samples by scaling the first and second partially whitened signals in accordance with an estimate of received noise.

3. The apparatus as claimed in claim 2, wherein the first partially whitened signals are formed by dividing the first channel estimation data by $\sigma_1^2$ and the second partially whitened signals are formed by dividing the second channel estimation data by $\tilde{\sigma}^2$, where $\sigma_1^2$ and $\tilde{\sigma}^2$ are determined in accordance with $$A = \begin{bmatrix} \mathrm{var}(e_1) & \mathrm{cov}(e_1, e_2) \\ \mathrm{cov}(e_2, e_1) & \mathrm{var}(e_2) \end{bmatrix} = \begin{bmatrix} \sigma_1^2 & c \\ c^* & \sigma_2^2 \end{bmatrix},$$

wherein A is a noise-to-variance matrix, and $$\tilde{\sigma}^2 = \sigma_2^2 - \frac{|c|^2}{\sigma_1^2},$$

wherein $e_1$ and $e_2$ are noise signals.

4. The apparatus as claimed in claim 1, wherein the symbol recovery unit comprises a digital signal processor.

5. The apparatus as claimed in claim 4, wherein the temporal whitening is performed by the digital signal processor configured to execute a series of instructions.

6. The apparatus as claimed in claim 1, wherein the stream of symbols are carried in the received signal by Gaussian minimum shift keying (GMSK) modulation.

7. The apparatus as claimed in claim 1, wherein the apparatus comprises a signal receiver of a base transceiver station of a mobile communications network.

8. The apparatus as claimed in claim 1, wherein the received signal comprises a radio signal.

9. A method comprising:
   sampling a received signal carrying a stream of symbols to form samples being a first set of actual samples;
   interpolating between the samples of the first set of actual samples to form a second set of interpolated samples;
   processing the first set of actual samples and the second set of interpolated samples to form an estimate of the stream of symbols of the received signal, wherein the processing includes performing temporal whitening on signals derived from the first set of actual samples and the second set of interpolated samples;
   demodulating, by a demodulator, the first set of actual samples and the second set of interpolated samples to produce first and second demodulated data sets, respectively; and
   performing, by a channel estimator, a channel estimation on the first and second demodulated data sets to form first and second channel estimation data sets, respectively, the first and second channel estimation data sets being the signals derived from the first set of actual samples and the second set of interpolated samples.

10. An apparatus comprising:
    a sampler configured to sample a received signal carrying a stream of symbols to form samples being a first set of actual samples;
    an interpolator configured to interpolate between the samples of the first set of actual samples to form a second set of interpolated samples; and
    a symbol recovery unit configured to process the first set of actual samples and the second set of interpolated samples to form an estimate of the stream of symbols of the received signal by performing a matched filtering operation by performing individual matched filter operations on signals derived from each of the first set of actual samples and the second set of interpolated samples and subsequently averaging outputs of the individual matched filter operations to form a matched filter output, wherein the symbol recovery unit comprises a demodulator configured to demodulate the first set of actual samples and the second set of interpolated samples to produce first and second demodulated data sets, respectively, and a channel estimator configured to perform a channel estimation on the first and second demodulated data sets to form first and second channel estimation data sets, respectively, the first and second channel estimation data sets being the signals derived from the first set of actual samples and the second set of interpolated samples.

11. The apparatus as claimed in claim 10, wherein the symbol recovery unit comprises:

a temporal whitening unit configured to perform temporal whitening on the first and second channel estimation data sets to form data to be input to the individual matched filter operations as the signals derived from each of the first set of actual samples and the second set of interpolated samples.

12. The apparatus as claimed in claim 10, wherein the individual matched filter operations are performed in accordance with $$Z_1(n) = \sum_{j=0}^{4} \text{Re}\left\{y_1''(n+j)\frac{h_1''(j)^*}{\sigma_1^2}\right\}, 0 < n < L-1$$

$$Z_2(n) = \sum_{j=0}^{4} \text{Re}\left\{y_2''(n+j)\frac{h_2''(j)^*}{\sigma^2}\right\}, 0 < n < L-1,$$

wherein n is a number of symbols, L is a length of symbols, Z is a matched filter operation, $y_1''$ and $y_2''$ are partially whitened samples, $h_1''$ and $h_2''$ are partially whitened taps and j is a cost function.

13. The apparatus as claimed in claim 10, wherein the symbol recovery unit comprises a digital signal processor.

14. The apparatus as claimed in claim 13, wherein the digital signal processor is configured to perform the individual matched filter operations by executing a series of instructions.

15. The apparatus as claimed in claim 10, wherein the stream of symbols is carried in the received signal by Gaussian minimum shift keying (GMSK) modulation.

16. The apparatus as claimed in claim 10, wherein the apparatus comprises a signal receiver of a base transceiver station of a mobile communications network.

17. The apparatus as claimed in claim 10, wherein the received signal comprises a radio signal.

18. A method comprising:

sampling a received signal carrying a stream of symbols to form samples being a first set of actual samples;

interpolating between the samples of the first set of actual samples to form a second set of interpolated samples; and processing the first set of actual samples and the second set of interpolated samples to form an estimate of the stream of symbols of the received signal, wherein the processing includes performing a matched filtering operation by performing individual matched filter operations on signals derived from each of the first set of actual samples and the second set of interpolated samples and subsequently averaging outputs of the individual matched filter operations to form a matched filter output;

demodulating, by a demodulator, the first set of actual samples and the second set of interpolated samples to produce first and second demodulated data sets, respectively; and performing, by a channel estimator, a channel estimation on the first and second demodulated data sets to form first and second channel estimation data sets, respectively, the first and second channel estimation data sets being the signals derived from the first set of actual samples and the second set of interpolated samples.

19. An apparatus comprising:

a sampler configured to sample a received signal carrying a stream of symbols to form samples being a first set of actual samples;

a symbol recovery unit configured to process the first set of actual samples and a second set of interpolated samples from the samples to form an estimate of the stream of symbols of the received signal by performing a matched filtering operation, wherein the matched filtering operation is performed by processing software, an output of which is passed for subsequent processing via a hardware matched filter having a plurality of filter taps, wherein all taps but one are set to zero, and wherein the symbol recovery unit comprises a demodulator configured to demodulate the first set of actual samples and the second set of interpolated samples to produce first and second demodulated data sets, respectively, and a channel estimator configured to perform a channel estimation on the first and second demodulated data sets to form first and second channel estimation data sets, respectively, the first and second channel estimation data sets being the signals derived from the first set of actual samples and the second set of interpolated samples.

20. The apparatus as claimed in claim 19, wherein the matched filtering operation is performed using a plurality of taps and the symbol recovery unit comprises an averaging means configured to receive and average the output of the processing software over the plurality of taps to provide an input to the hardware matched filter.

21. The apparatus as claimed in claim 19, wherein the apparatus comprises a plurality of components configured to define a signal path from a radio frequency signal input to a baseband signal output, and the apparatus comprises a signal processor located on the signal path configured to execute the processing software, and a reconfigurable non-volatile memory configured to store the processing software for execution by the signal processor, the apparatus is configured such that irrespective of a configuration of the memory, the hardware matched filter is located on the signal path between the signal processor and the output.

22. The apparatus as claimed in claim 19, wherein the hardware matched filter has a primary tap and the one tap is the primary tap of the hardware matched filter.

23. The apparatus as claimed in claim 19, wherein the subsequent processing includes equalization.

24. The apparatus as claimed in claim 19, wherein the stream of symbols is carried in the received signal by Gaussian minimum shift keying (GMSK) modulation.

25. The apparatus as claimed in claim 19, wherein the apparatus comprises a signal receiver of a base transceiver station of a mobile communications network.

26. The apparatus as claimed in claim 19, wherein the received signal comprises a radio signal.

27. A method, comprising:
sampling a received signal carrying a stream of symbols to form samples being a first set of actual samples;
processing the first set of actual samples and a second set of interpolated samples from the samples to form an estimate of the stream of symbols of the received signal, wherein the processing includes performing a matched filtering operation by processing software; and
processing an output of the processing software by a hardware matched filter having a plurality of filter taps, wherein all but one tap are set to zero;
demodulating, by a demodulator, the first set of actual samples and the second set of interpolated samples to produce first and second demodulated data sets, respectively; and
performing, by a channel estimator, a channel estimation on the first and second demodulated data sets to form first and second channel estimation data sets, respectively, the first and second channel estimation data sets being the signals derived from the first set of actual samples and the second set of interpolated samples.

28. A terminal, comprising:
a signal receiver including
a sampler configured to sample a received signal carrying a stream of symbols to form samples being a first set of actual samples,
an interpolator configured to interpolate between the samples of the first set of actual samples to form a second set of interpolated samples,
a symbol recovery unit configured to process the first set of actual samples and the second set of interpolated samples to form an estimate of the stream of symbols of the received signal by performing temporal whitening on signals derived from the first set of actual samples and the second set of interpolated samples,
wherein the symbol recovery unit comprises
a demodulator configured to demodulate the first set of actual samples and the second set of interpolated samples to produce first and second demodulated data sets, respectively, and
a channel estimator configured to perform a channel estimation on the first and second demodulated data sets to form first and second channel estimation data sets, respectively, the first and second channel estimation data sets being the signals derived from the first set of actual samples and the second set of interpolated samples.

29. A network element comprising:
a signal receiver including
a sampler configured to sample a received signal carrying a stream of symbols to form samples being a first set of actual samples,
an interpolator configured to interpolate between the samples of the first set of actual samples to form a second set of interpolated samples, and
a symbol recovery unit configured to process the first set of actual samples and the second set of interpolated samples to form an estimate of the stream of symbols of the received signal by performing temporal whitening on signals derived from the first set of actual samples and the second set of interpolated samples,
wherein the symbol recovery unit comprises
a demodulator configured to demodulate the first set of actual samples and the second set of interpolated samples to produce first and second demodulated data sets, respectively, and
a channel estimator configured to perform a channel estimation on the first and second demodulated data sets to form first and second channel estimation data sets, respectively, the first and second channel estimation data sets being the signals derived from the first set of actual samples and the second set of interpolated samples.

30. A system, comprising:
a network having at least one network element; and
a communication terminal configured to perform wireless communication with the network element,
wherein at least one of the network element and the communication terminal include a signal receiver, said signal receiver including
a sampler configured to sample a received signal carrying out a stream of symbols to form samples being a first set of actual samples,
an interpolator configured to interpolate between the samples of the first set of actual samples to form a second set of interpolated samples, and
a symbol recovery unit configured to process the first set of actual samples and the second set of interpolated samples to form an estimate of the stream of symbols of the received signal by performing temporal whitening on signals derived from the first set of actual samples and the second set of interpolated samples,
wherein the symbol recovery unit comprises
a demodulator configured to demodulate the first set of actual samples and the second set of interpolated samples to produce first and second demodulated data sets, respectively, and
a channel estimator configured to perform a channel estimation on the first and second demodulated data sets to form first and second channel estimation data sets, respectively, the first and second channel estimation data sets being the signals derived from the first set of actual samples and the second set of interpolated samples.

31. A terminal, comprising:
a signal receiver, including
a sampler configured to sample a received signal carrying a stream of symbols to form samples being a first set of actual samples, and
a symbol recovery unit configured to process the first set of actual samples and a second set of interpolated samples to form an estimate of the stream of symbols of the received signal by performing a matched filtering operation,
wherein the matched filtering operation is performed by processing software, an output of which is passed for subsequent processing via a hardware matched filter, having a plurality of filter taps, wherein all taps but one tap are set to zero,
wherein the symbol recovery unit comprises
a demodulator configured to demodulate the first set of actual samples and the second set of interpolated samples to produce first and second demodulated data sets, respectively, and
a channel estimator configured to perform a channel estimation on the first and second demodulated data sets to form first and second channel estimation data sets, respectively, the first and second channel estimation data sets being the signals derived from the first set of actual samples and the second set of interpolated samples.

32. A network element comprising:

a signal receiver including a sampler configured to sample a received signal carrying a stream of symbols to form samples being a first set of actual samples, and a symbol recovery unit configured to process the first set of actual samples and a second set of interpolated samples to form an estimate of the stream of symbols of the received signal by performing a matched filtering operation, wherein the matched filtering operation is performed by processing software, an output of which is passed for subsequent processing via a hardware matched filter, having a plurality of filter taps, wherein all taps but one tap are set to zero, wherein the symbol recovery unit comprises a demodulator configured to demodulate the first set of actual samples and the second set of interpolated samples to produce first and second demodulated data sets, respectively, and a channel estimator configured to perform a channel estimation on the first and second demodulated data sets to form first and second channel estimation data sets, respectively, the first and second channel estimation data sets being the signals derived from the first set of actual samples and the second set of interpolated samples.

33. A system, comprising:

a network having at least one network element; and a communication terminal configured to perform wireless communication with the network element, wherein at least one of the network element and the communication terminal include a signal receiver, said signal receiver including a sampler configured to sample a received signal carrying a stream of symbols to form samples being a first set of actual samples, and a symbol recovery unit configured to process the first set of actual samples and a second set of interpolated samples to form an estimate of the stream of symbols of the received signal by performing a matched filtering operation, wherein the matched filtering operation is performed by processing software, an output of which is passed for subsequent processing via a hardware matched filter, having a plurality of filter taps, wherein all taps but one tap are set to zero, wherein the symbol recovery unit comprises a demodulator configured to demodulate the first set of actual samples and the second set of interpolated samples to produce first and second demodulated data sets, respectively, and a channel estimator configured to perform a channel estimation on the first and second demodulated data sets to form first and second channel estimation data sets, respectively, the first and second channel estimation data sets being the signals derived from the first set of actual samples and the second set of interpolated samples.

\* \* \* \* \*